United States Patent [19]
Morinaka et al.

[11] Patent Number: 5,995,206
[45] Date of Patent: *Nov. 30, 1999

[54] THERMAL OBJECT MEASURING APPARATUS

[75] Inventors: Katsuya Morinaka, Toyonaka; Nobuyuki Yoshiike, Ikoma; Kazuhiko Hashimoto, Moriguchi; Tetsuya Kawai, Kadoma, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/122,771

[22] Filed: Jul. 27, 1998

Related U.S. Application Data

[62] Division of application No. 08/629,937, Apr. 12, 1996, Pat. No. 5,877,688.

[30] Foreign Application Priority Data

| | | | |
|---|---|---|---|
| Apr. 12, 1995 | [JP] | Japan | 7-087129 |
| May 25, 1995 | [JP] | Japan | 7-126366 |

[51] Int. Cl.$^6$ .............. G01C 3/08; G01B 11/26; G08B 13/18; G01N 25/00
[52] U.S. Cl. ............ 356/4.01; 340/552; 356/141.1; 356/141.5; 374/6
[58] Field of Search ............ 356/141.1, 141.5, 356/4.01, 5.01, 5.1; 340/552; 374/6

[56] References Cited

U.S. PATENT DOCUMENTS

| | | | |
|---|---|---|---|
| H1066 | 6/1992 | Petropoulos et al. | 250/338.5 |
| 3,781,111 | 12/1973 | Fletcher et al. . | |
| 4,229,103 | 10/1980 | Hipp | 356/141.1 |
| 4,479,053 | 10/1984 | Johnston . | |
| 4,510,390 | 4/1985 | Rajchman . | |
| 4,567,766 | 2/1986 | Seiferling . | |
| 4,688,919 | 8/1987 | Ogawa et al. . | |
| 4,858,000 | 8/1989 | Lu . | |
| 4,914,734 | 4/1990 | Love et al. . | |
| 5,008,522 | 4/1991 | Kundi . | |
| 5,015,868 | 5/1991 | Park . | |
| 5,026,153 | 6/1991 | Suzuki et al. . | |
| 5,031,228 | 7/1991 | Lu . | |
| 5,107,128 | 4/1992 | Davall et al. . | |
| 5,568,400 | 10/1996 | Stark et al. . | |

FOREIGN PATENT DOCUMENTS

| | | |
|---|---|---|
| 0358911A3 | 3/1990 | European Pat. Off. . |
| 3816657A1 | 11/1989 | Germany . |
| 3905929C1 | 4/1990 | Germany . |
| 9312118 U | 11/1993 | Germany . |
| 63-307378 | 12/1988 | Japan . |
| 3-087684 | 4/1991 | Japan . |
| 5-180632 | 7/1993 | Japan . |

OTHER PUBLICATIONS

"Multi–Sensor Image Interpretation Using Laser Radar And Thermal Images," by Chen–Chau et al., pp. 190–196.

"Modelling And Simulation Of An Angular Scan LED Array–Based Range Imaging Sensor," by Janusz A. Marszalec, *IEEE/RSJ International Conference on Intelligent Robots and Systems*, Yokohama, Japan, Jul. 26–30, 1993.

"The Mobile Intrusion Detection And Assessment System (MIDAS)," by H. Arlowe et al., *International Carnahan Conference on Security Technology Crime Countermeasures*, Lexington, Kentucky, Oct. 10–12, 1990.

*Primary Examiner*—Stephen C. Buczinski
*Attorney, Agent, or Firm*—Smith, Gambrell & Russell, LLP

[57] ABSTRACT

A thermal object detecting method for; obtaining a thermal image of a measuring space by two-dimensional thermal image detecting method for detecting two-dimensional thermal image information, obtaining position information of an object in the measuring space by object position detecting device, obtaining distance data between said two-dimensional thermal image detecting device and said object from the position information, and correcting the temperature level of the object in the thermal image in the measuring space or correcting the size of the object in the thermal image in said measuring space, using the distance data from the object as correction factor.

8 Claims, 21 Drawing Sheets

FIG. 3(A)
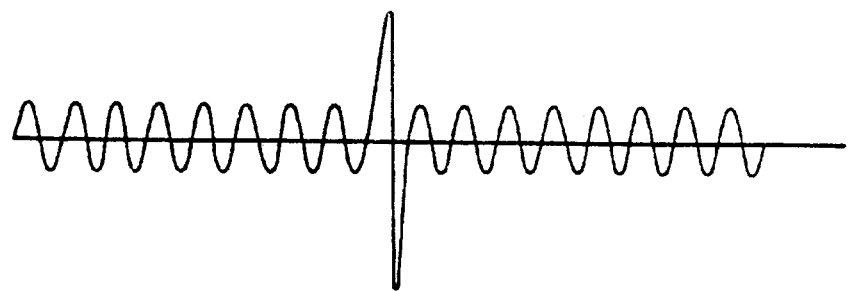
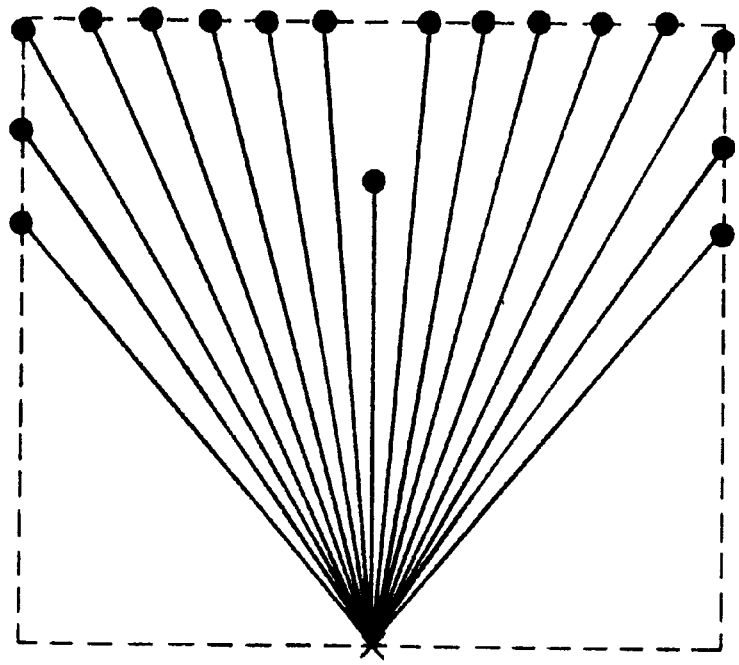
FIG. 3(B)

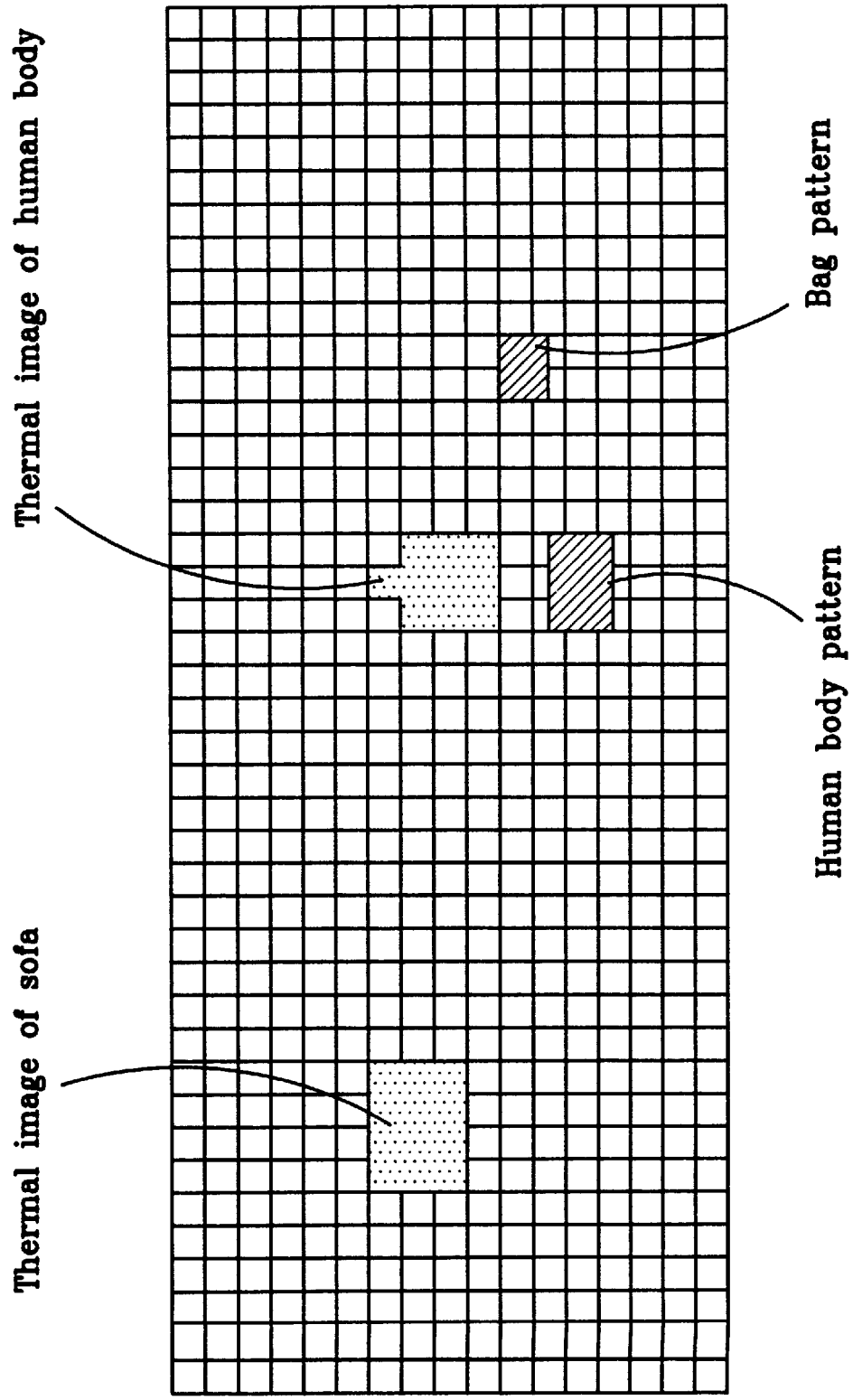

15 Lens for infrared LED
2 Infrared LED
3 Photo diode
14 Lens for photo diode

1 Infrared ray sensor
4 Distance sensor
7 Motor
22 Rotary belt

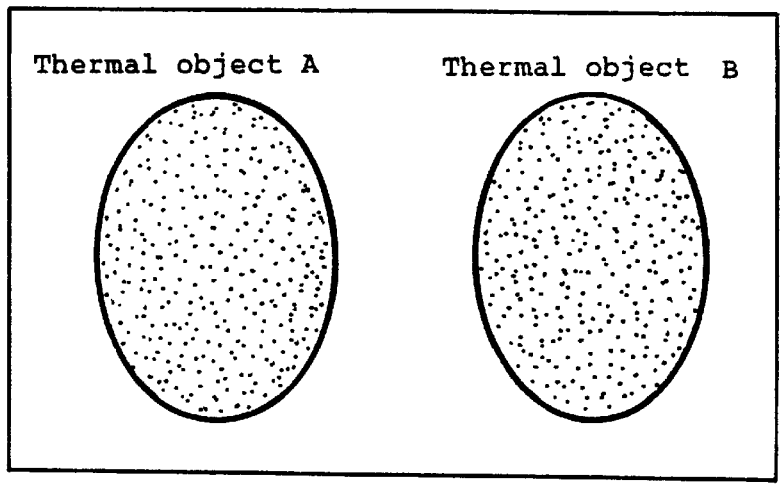
FIG. 21
FIG. 22
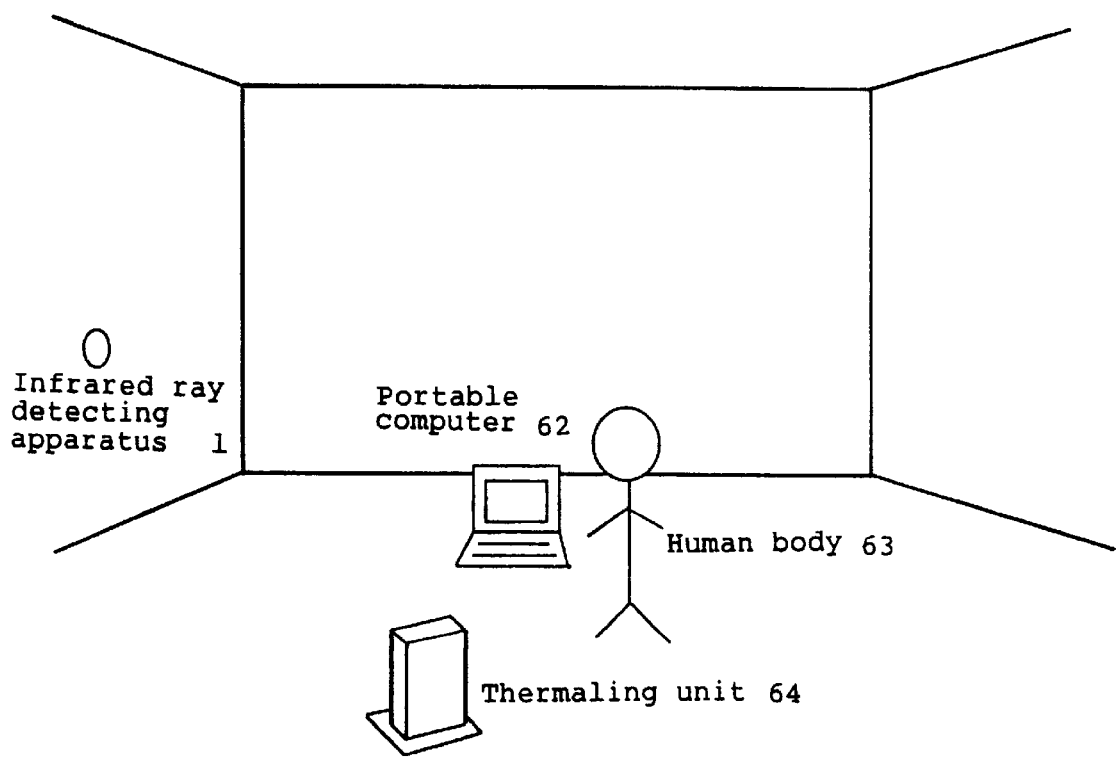

THERMAL OBJECT MEASURING APPARATUS

This application is a division of application Ser. No. 08/629,937, filed Apr. 12, 1996, now U.S. Pat. No. 5,877,688.

BACKGROUND OF THE INVENTION

1. Field of the Invention

The present invention relates to a thermal object measuring apparatus for detecting a thermal object by using a pyroelectric sensor for detecting infrared rays, (in particular, heat rays) and a distance sensor using near infrared rays.

2. Related Art of the Invention

Recently there is a growing need for means of detecting a human body, without making any contact, in the field of air-conditioning, lighting, security and others.

As means for detecting human bodies existing in a space, various methods have been used or proposed so far, including a method of using a CCD camera to detect a human body from the obtained image, a method of detecting a human body by detecting an infrared ray using a quantum type infrared ray camera, and a method of detecting a voltage output generated while a thermal object moves by installing a Fresnel lens before the sensor, and by using an inexpensive pyroelectric type infrared ray sensor.

However, in the method using a CCD camera mentioned above, the detection algorithm for picking up a human body from the image is very complicated, the apparatus is huge, the processing time is long, and the system is very expensive. In the method of using the quantum type infrared ray sensor, the sensor must be cooled during operation, and the apparatus is large and expensive, so it is not practical for general use. The method of using the pyroelectric type sensor solves the problems of the size and price of the quantum type sensor, but a still human body cannot be detected, and errors are caused by wind or the like. By installing a chopper before the sensor, a still human body can be measured, but other heat sources having a similar radiation temperature and area may be mistook as a human body.

As a distance sensor for measuring the distance to an object, methods of using ultrasonic waves, millimeter waves, and laser radar are known. The method of using ultrasonic waves is practical at a distance of about 5 m, but at a further distance it is hard to enhance the directivity up to the precision required for detecting a human body. The methods of using millimeter waves and laser radar are actually used in the field of measuring the bumper-to-bumper distance of vehicles, but the apparatus is very large and expensive, and it is harmful to the eyes, and there were many restrictions for its use.

SUMMARY OF THE INVENTION

It is hence an object of the invention to present a thermal object measuring apparatus capable of detecting at high precision, lowered in price and reduced in size, in consideration of the problems of the prior art, and a distance detector and others to be used therein.

The invention according to a first embodiment relates to a thermal object measuring apparatus comprising infrared ray detecting means possessing one or more photo sensors for detecting infrared rays radiated from an object, distance measuring means possessing at least one pair of an infrared emitter and photo sensor for detecting the distance to the object, and sensor signal processing means for determining the spatial temperature distribution and object distance distribution, by making use of the outputs from the infrared rate detecting means and distance detecting means.

The invention detects a human body with high precision by an inexpensive and small apparatus because the spatial temperature distribution and distance information for the object in space can be obtained.

The invention according to another embodiment relates to a thermal object detecting method comprising the steps of:

obtaining a thermal image of a measuring space by a two-dimensional thermal image detecting method for detecting two-dimensional thermal image information, obtaining position information of an object in the measuring space by object position detecting means, obtaining distance data for a distance between said two-dimensional thermal image detecting means and said object from the position information, and correcting the temperature level of the object in the thermal image of the measuring space or correcting the size of the object in the thermal image of said measuring space, using the distance data from the object as a correction factor.

The invention detects, for example, the human body with high precision by specifying the size of the thermal object and temperature level of the thermal object detected from the two-dimensional thermal image and object position information.

BRIEF DESCRIPTION OF THE DRAWINGS

FIG. 3(A) is a diagram showing an output waveform of an infrared ray sensor and FIG. 3(b) is a distance distribution measured by the distance sensor in the first embodiment.

FIG. 12 is a pattern diagram showing the results of the measuring state for the fifth embodiment.

FIG. 21 shows the mode after correction of the thermal image in FIG. 18 by a distance factor.

FIG. 22 is a schematic diagram of a measuring space for an eleventh embodiment of the invention.

PREFERRED EMBODIMENTS

Figure 1:
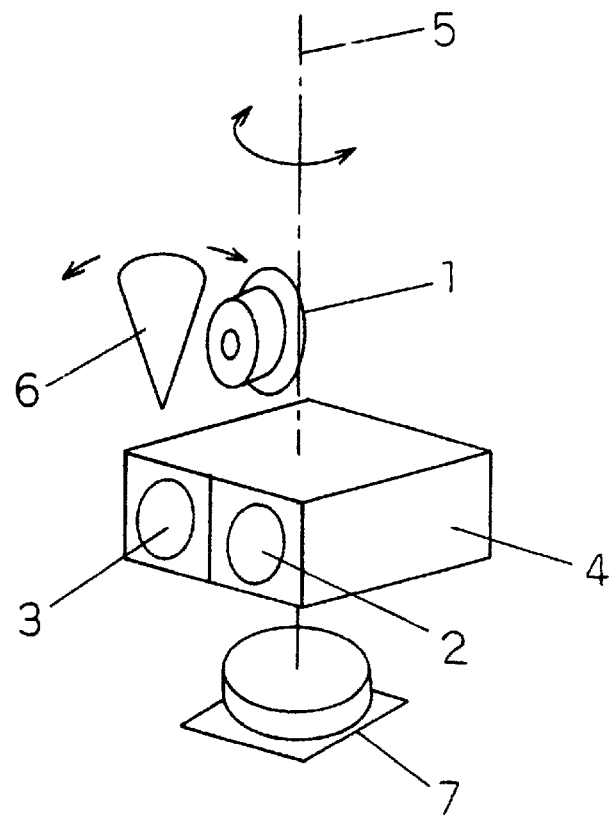
FIG. 1 is a structural diagram showing an outline of a thermal object measuring apparatus according to a first embodiment of the invention.

Referring now to the drawings, preferred embodiments of the invention are described in detail below.

(Embodiment 1)

FIG. 1 is a structural diagram showing an outline of a thermal object measuring apparatus according to a first embodiment of the invention. In FIG. 1, on the front side of a pyroelectric type infrared ray sensor 1 (serving as an infrared ray detecting means), a chopper 6 is provided for periodically blocking the infrared rays entering the photo sensor 1. A distance sensor 4 (serving as distance measuring means) is composed of an infrared LED 2, which is an infrared ray emitting element, and a photo diode 3 which is a light receiving element. The infrared ray sensor 1 and distance sensor 4 are connected to a motor 7, which acts as a rotary scanning means, so as to be free to rotate right and left about a rotary shaft 5. Herein, the confronting direction of the infrared ray sensor 1 and the confronting direction of the distance sensor 4 are adjusted to face the same direction.

In the thermal object measuring apparatus of the first embodiment, the operation is described below.

Figure 2:
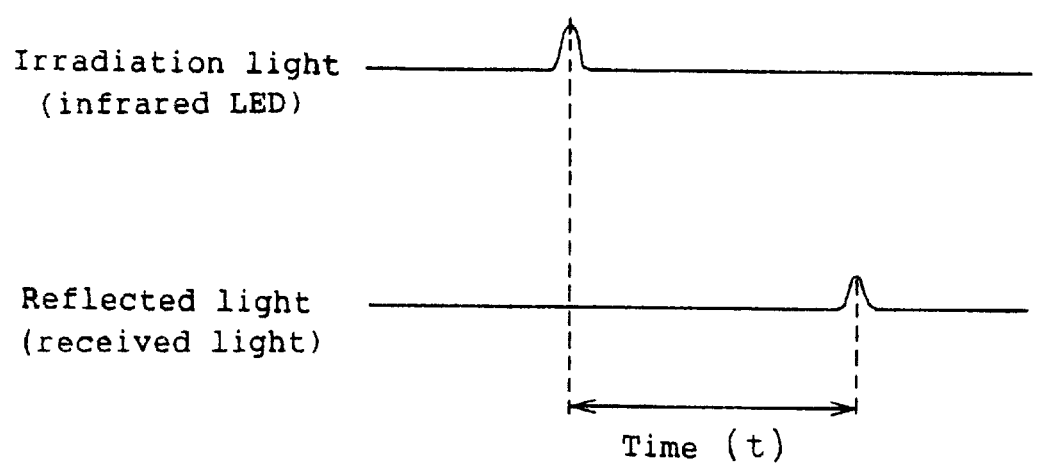
FIG. 2 is a time chart of a sensor signal of a distance sensor in the first embodiment.

Suppose the motor 7 is driven to rotate the infrared ray sensor 1 about the rotary shaft 5, then a sensor output corresponding to the temperature difference of the chopper 6 and an object is obtained when the infrared ray sensor 1 confronts the object and the radiation temperature of the object is different from that of the chopper 6. The distance sensor 4, as shown in the time chart in FIG. 2, projects an amplitude-modulated light (a near infrared ray) from the infrared LED 2, and the returning light reflected by the object is received by the photo diode 3. Therefore, the distance from the sensor to the object can be determined on the basis of the time difference between the projected waveform and the receiving waveform, and the speed of light.

FIG. 3(A) shows the output waveform of the infrared ray sensor 1 when measuring a person standing before the apparatus. FIG. 3(B) shows the distance distribution (solid circles) from the sensor to a person measured by the distance sensor 4. Herein, the optical axes of the infrared ray sensor 1 and the distance sensor 5 are adjusted parallel to the floor. As the rotation of the motor 1 starts, a sensor output corresponding to the temperature difference between the confronting viewing field and chopper 6 is thereby generated by the infrared ray sensor 1. The distance sensor 4 emits light to the confronting viewing field from the infrared LED 2, receives the reflected light from the object in the photo diode 3, and calculates the distance from the time difference. The motor 7 is operated, and the motor 7 is stopped in the next viewing field, and emission from the infrared LED 2, reception by the photo diode 7, and distance calculation are repeated. As clear from FIG. 3, it is known that an object of high temperature is present in the ninth viewing field from the start of rotation of the motor 7, and is located toward the apparatus from before the wall.

(Embodiment 2)

Figure 4:
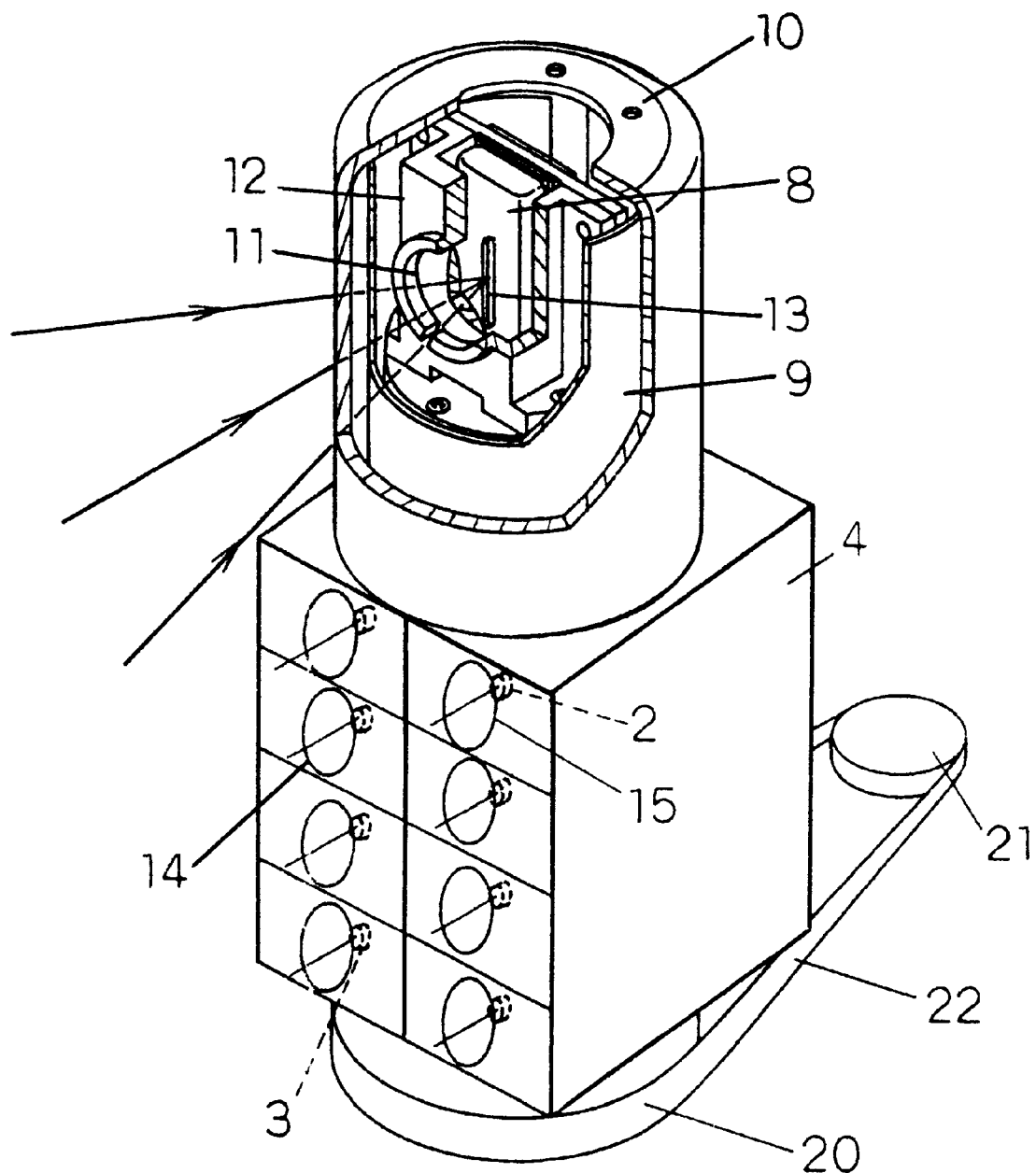
FIG. 4 is a partially cut-away perspective view of a thermal object measuring apparatus in a second embodiment of the invention.

FIG. 4 is a partially cut-away perspective view of a thermal object measuring apparatus according to a second embodiment of the invention. In FIG. 4, the infrared rays radiated from the thermal object are intermittently interrupted along their optical path by a cylindrical chopper 9. The light is condensed by an infrared ray condenser lens 11, and is focused on a photo sensor inside an infrared ray array sensor 8 through a slit 13 of the infrared ray array sensor 8. The infrared ray condenser lens 11 and infrared ray array sensor 8 are supported by a sensor fixing unit 12.

Figure 5:
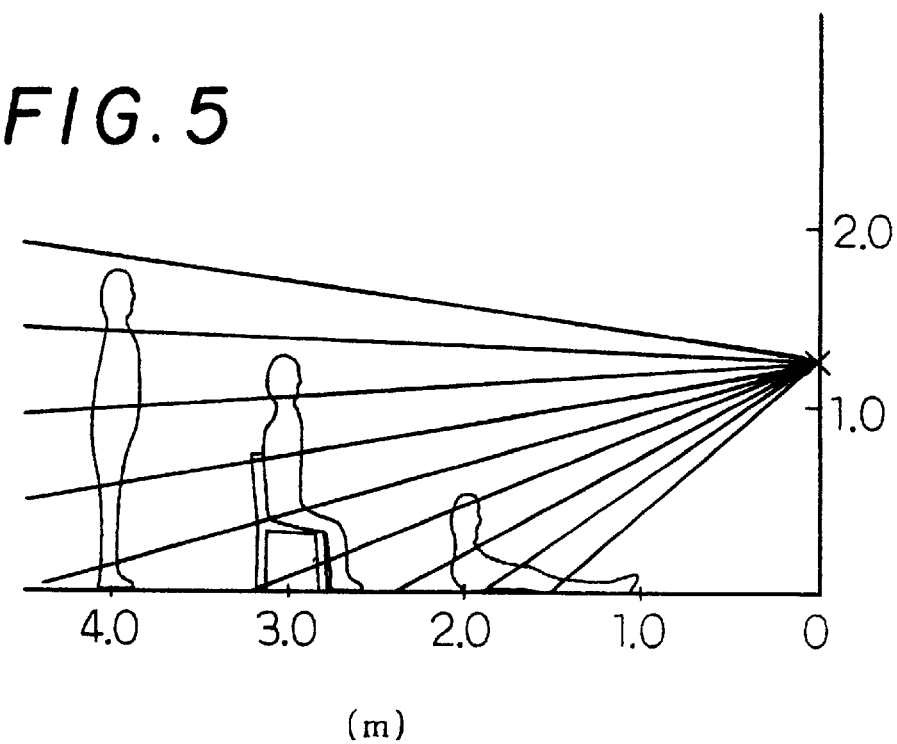
FIG. 5 is a diagram showing a viewing field distribution of the infrared ray sensor in the second embodiment.
Figure 6:
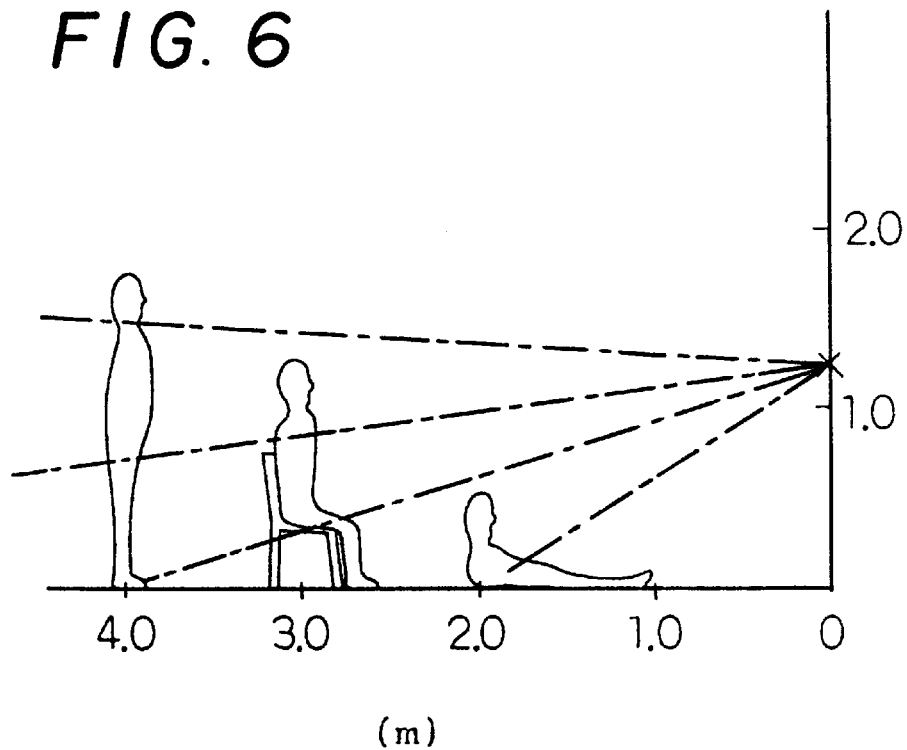
FIG. 6 is a diagram showing a viewing field distribution of the distance sensor in the second embodiment.

In this embodiment, the infrared ray array sensor 8 comprises eight photo sensors, and the viewing field distribution in the vertical direction, with the sensor installed as a height of 1.2 m, is shown in FIG. 5. The viewing field that can be detected by one photo sensor is a range from a solid line to an adjacent solid line, at 6 degrees in the vertical direction. Therefore, the total view of eight photo sensors is 48 degrees. On the other hand, the distance sensor 4 is installed beneath the infrared ray sensor 10, and the optical axes in the horizontal direction are adjusted to be in same direction. The near infrared ray emitted from the infrared LED 2 is condensed into a beam having an angle of 1 degree by a lens 15 for infrared LED, and is projected onto the object. The returning beam reflected by the object is condensed by a lens 14 for the photo diode 3 and enters the photo diode 3. In this embodiment, the number of infrared LEDs 2 and photo diodes 3 is four respectively, and the viewing field distribution in the vertical direction, by installing the sensor at a height of 1.2 m, is shown in FIG. 6. The single-dot chain line refers to the optical axes of each near infrared ray, and they are arranged in the vertical direction so as to detect a lying person on the floor, a sitting person, and a standing person by the window. Of course, the optical axis in the vertical direction of each pair of infrared LED 2 and photo diode 3 are in coincidence with the others.

The infrared ray sensor 10 and distance sensor 4 are fixed on a sensor turntable 20. When a stepping motor 21 rotates, its driving force is transmitted to the sensor turntable 20 through a rotary belt 22. In the first viewing field, a cylindrical chopper 9 is rotated by the infrared ray sensor 10, and the one-dimensional temperature distribution of the space is measured, while, at the same time, the one-dimensional distance distribution of the space is measured by the distance sensor 4. Consequently, rotating the stepping motor 21 by a specific angle, the sensor is directed to the next viewing field and is stopped. Wherein, at every 3 degrees in the horizontal direction, the one-dimensional temperature distribution and distance distribution of the space are measured in the same manner as mentioned above. Similarly, continuous viewing fields are measured, and by connecting the information, a two-dimensional temperature distribution and distance distribution of the space are obtained.

(Embodiment 3)

Figure 7:
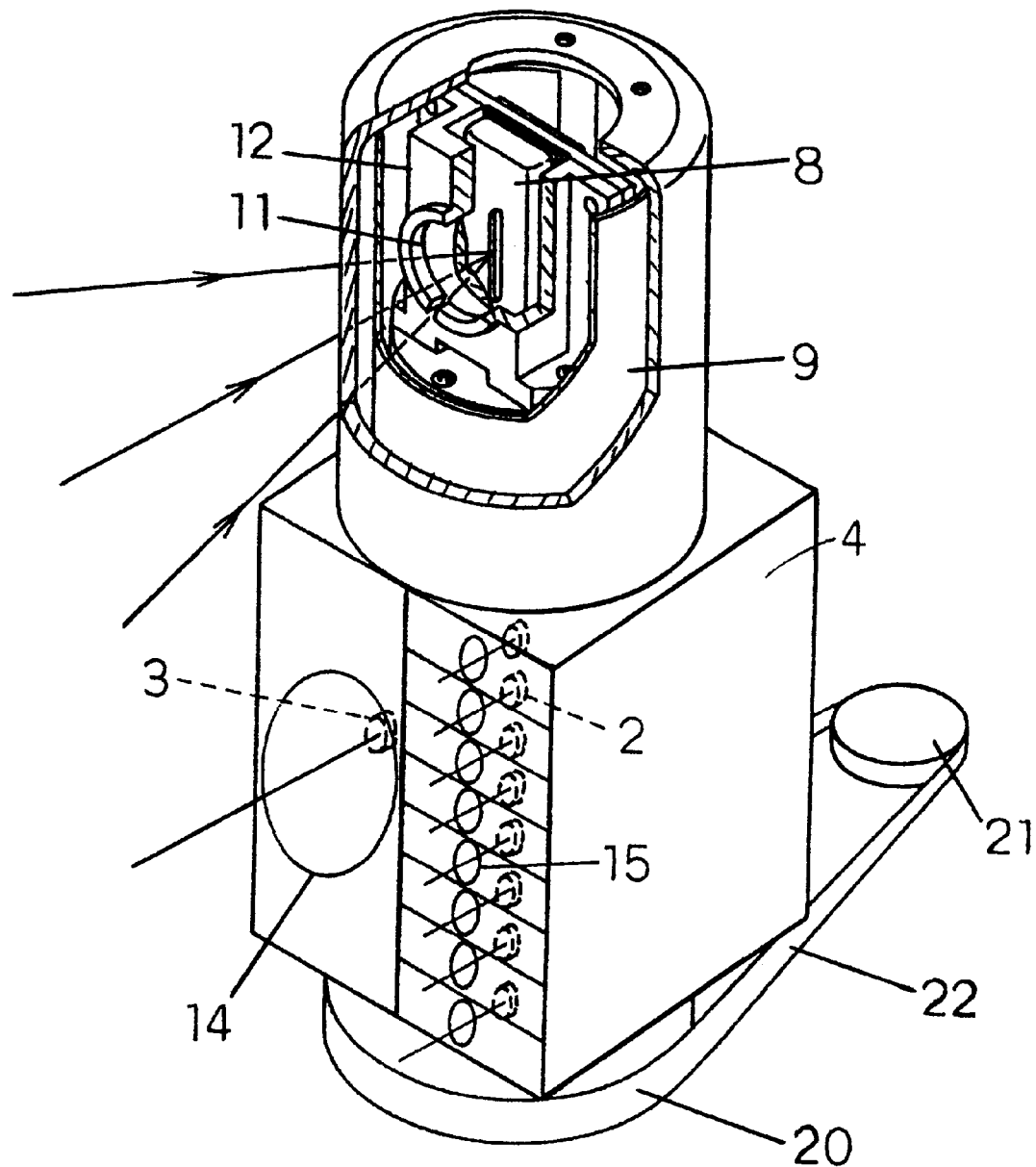
FIG. 7 is a partially cut-away perspective view of a thermal object measuring apparatus in a third embodiment of the invention.

FIG. 7 is a partially cut-away perspective view of a third embodiment according to the invention, modifying the thermal object measuring apparatus of embodiment 2. The measuring procedure is the same as explained in embodiment 2, but: this embodiment is simplified in the structure of the apparatus by using only one lens 14 for photo diode and one photo diode 3. In order not to sacrifice precision, the lens 14 for the photo diode is wider in area. Eight infrared LEDs 2 are used.

The method of calculating the distance by receiving the near infrared rays from the plurality of infrared LEDs 2 by one photo diode 3 is explained below.

Figure 8:
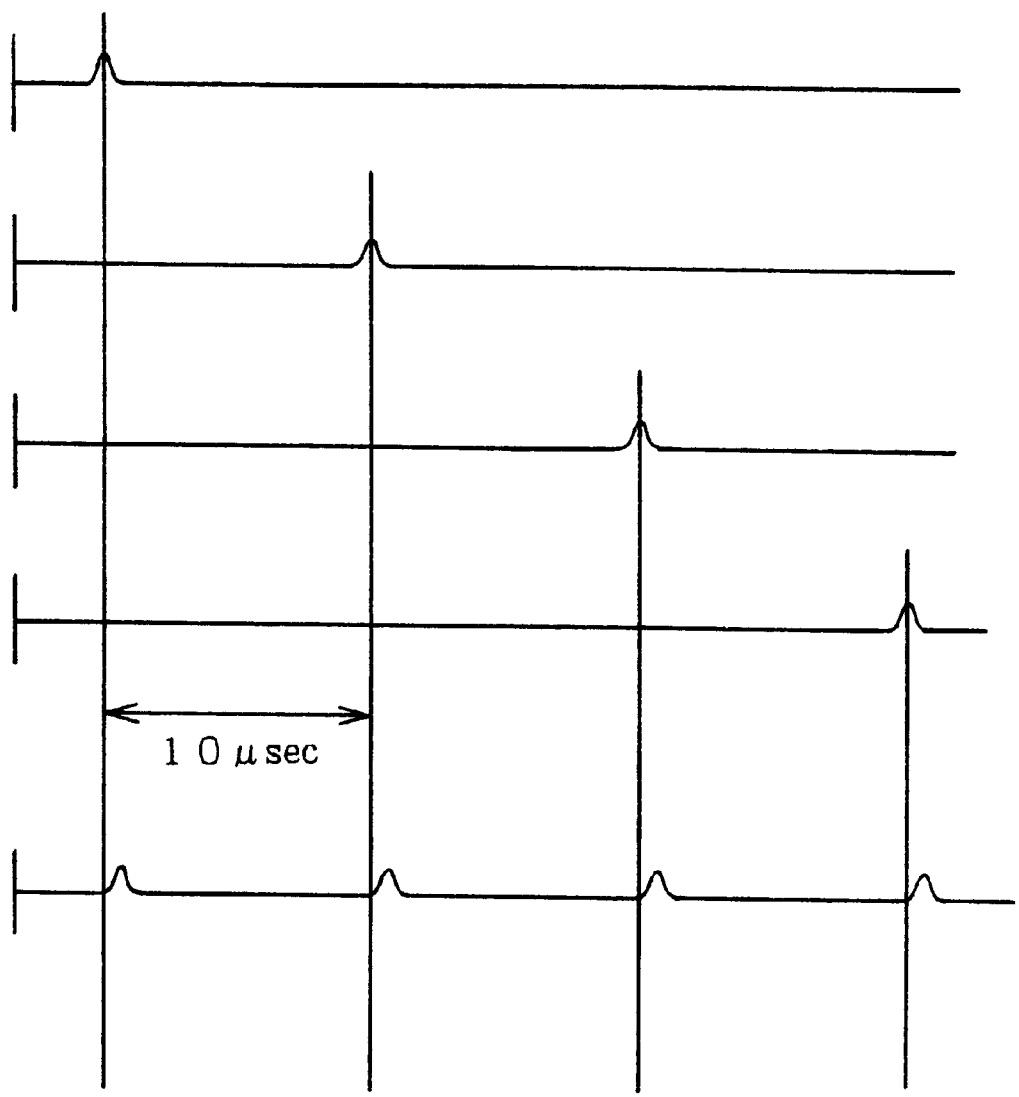
FIG. 8 is a time chart of a sensor signal of a distance sensor in the third embodiment.

A time chart of the sensor signals of the distance sensor 4 is shown in FIG. 8. When the emission by the first infrared LED 2 and emission by the second infrared LED 2 (similarly hereinafter, emission by the n-th infrared LED 2 and emission by the n+1-th infrared LED 2) are delayed by 10 μsec each, if the distance to the object is not more than scores of meters, the reflected light returning from the object arrives at a delay of within 100 nsec, and hence it is easy to measure the distance by sampling over time.

(Embodiment 4)

Figure 9:
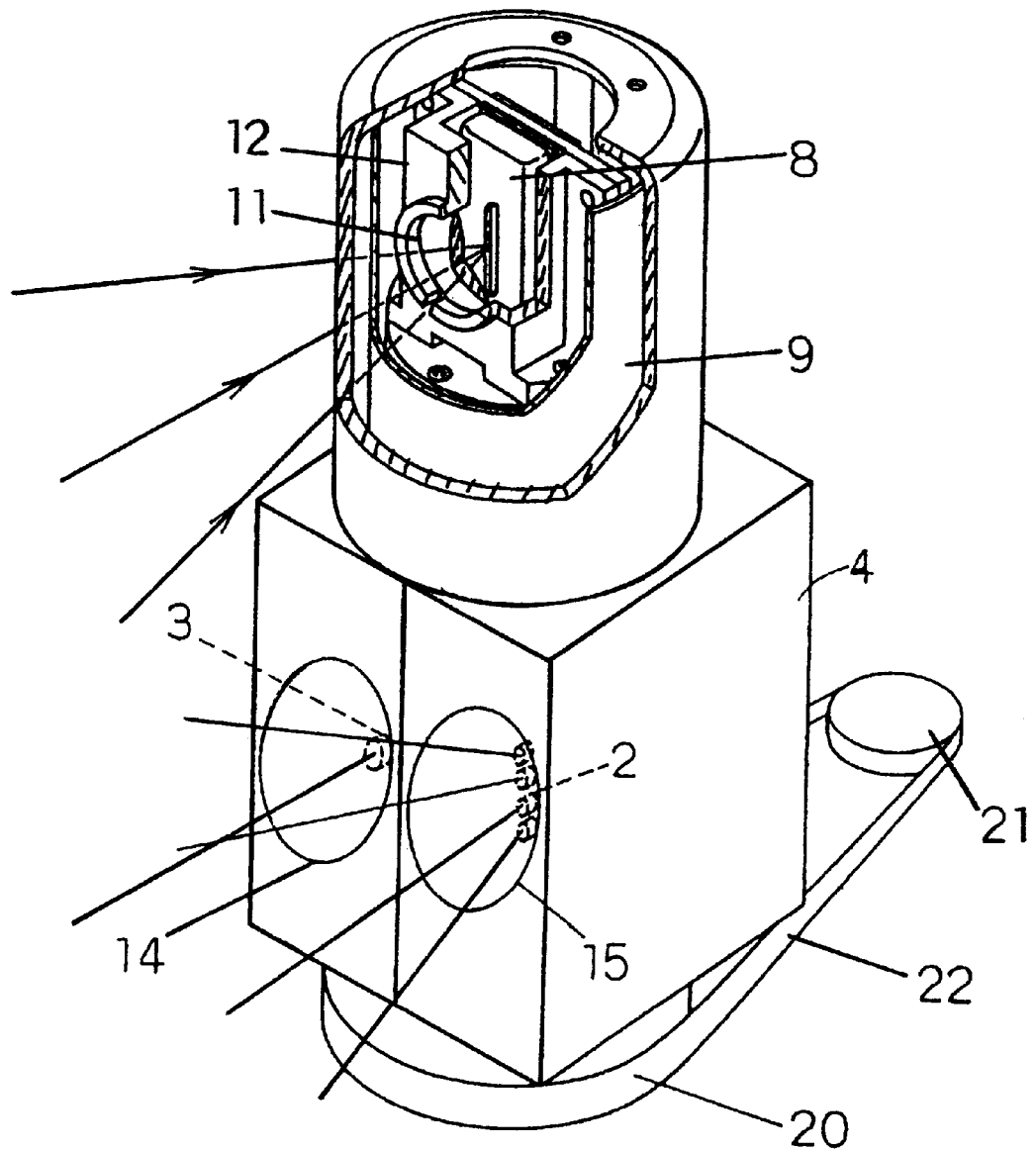
FIG. 9 is a partially cut-away perspective view of a thermal object measuring apparatus in a fourth embodiment of the invention.

FIG. 9 is a partially cut-away perspective view of a fourth embodiment, modifying the thermal object measuring apparatus of embodiment 3. The measuring procedure is the same as explained in embodiment 2 and embodiment 3, but this embodiment is simplified in the structure of the apparatus by using one lens 15 disposed on the front side of the infrared LEDs 2 arranged in an array. So as not to sacrifice precision, the lens 15 is wider in area. Of course, each optical axis of the arrayed infrared LEDs 2 is adjusted. In this method, the number of parts can be curtailed and the size is reduced without lowering the precision.

(Embodiment 5)

Figure 10:
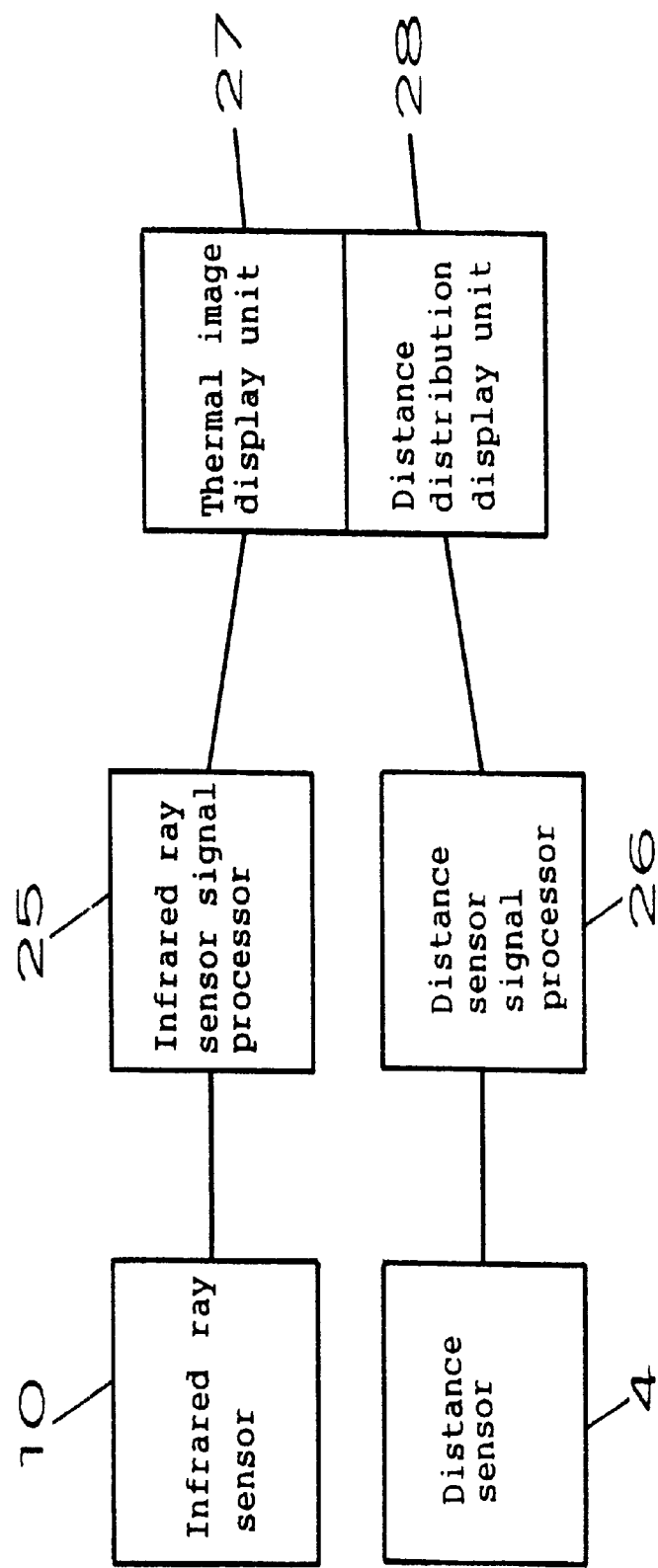
FIG. 10 is a block diagram of a thermal object measuring apparatus in a fifth embodiment of the invention.

FIG. 10 is a block diagram of a thermal object measuring apparatus according to a fifth embodiment of the invention. In FIG. 10, an analog signal obtained from the infrared sensor 10 is A/D converted in an infrared ray sensor signal processor 25. On the other hand, the sensor signal obtained from the distance sensor 4 is A/D converted as distance information in a distance sensor signal processor 26. The two-dimensional temperature distribution information of the measured space outputted from the distance sensor signal processor 25 is displayed in a thermal image display unit 27 by using a color display suited to each temperature. The two-dimensional distance distribution outputted from the distance sensor signal processor 26 is displayed in a distance distribution display unit 38 by using a color display suited to each distance. Herein, the infrared ray sensor signal processor 25 and the distance sensor signal processor 26 compose sensor signal processing means, and the thermal image display unit 27 and distance distribution display unit 28 compose image display means. As the infrared ray sensor 10 and distance sensor 4, any corresponding unit disclosed in embodiment 1 to embodiment 4 may be used.

Figure 11:
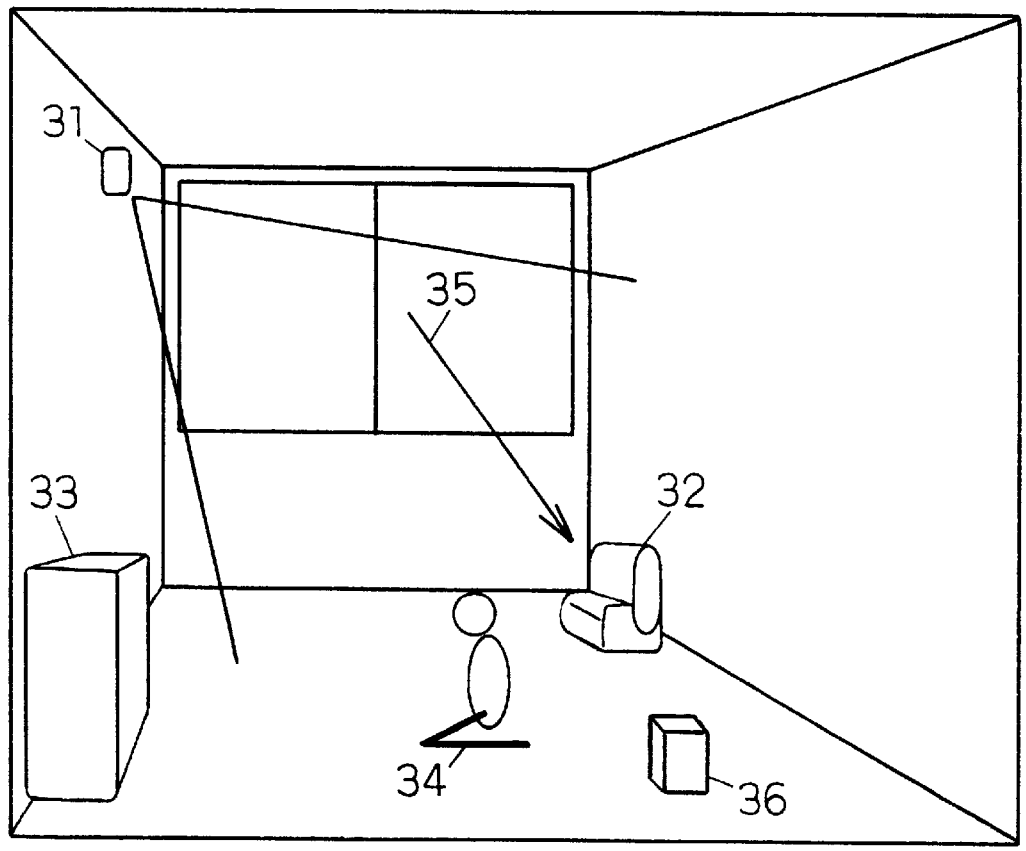
FIG. 11 is a perspective view showing a measuring state for the fifth embodiment.

FIG. 11 is a diagram showing a mode of measurement by using the thermal object measuring apparatus in the fifth embodiment. In the room shown in FIG. 11, there is a closet 33 and a sofa 32, and a sensor unit of the thermal object measuring apparatus of this embodiment is installed on the wall. Suppose a condition in which sunlight 35 enters from outside, and the sofa 32 in the room is warmed.

First, the distance image of an unmanned room is preliminarily measured by the distance sensor. When a person carrying a bag enters the room, the sensor unit 31 is actuated to measure the two-dimensional thermal image by the infrared ray sensor and the distance image of the object by the distance sensor. The distance image cuts out the newly emerging object image by the difference from the distance image of the initial state measured preliminarily. Therefore, the sofa 32 is initially present and is not produced as an object image. The result is shown in FIG. 12 together with the thermal image obtained by the infrared sensor. The dark area indicates the thermal image, and the shaded area is the object pattern cut out from the distance image.

The thermal image is recognized at the position of the human body 34 and near the sofa 32, and in the object pattern cutout from the distance image, the position of the human body 34 and the position of bag 36 are confirmed. When detecting an invading human body, if judged by the thermal image only, two persons are judged at the position of the actual human body 34 and at the position of the sofa 32, and if judged by the data of the distance sensor only, two persons are also newly judged at the position of the actual human body 34 and at the position of the bag 36. However, by combining the thermal image and object detection of the newly invading objects, only the human body overlaps with the thermal image, so that one human body is judged, and thereby the human body can be detected precisely.

Moreover, supposing there are plural human bodies, when one person is present nearby, and when plural people are present at one remote place, it is hard to judge by one measured temperature distribution alone, but it is possible to judge empirically from the time-course change values of the taken-in temperature distribution. By introducing the fuzzy theory using a membership function in the judgment, it is possible to judge at higher precision. Such information may be applied, for example, in the viewer survey and control of air-conditioning and lighting system.

(Embodiment 6)

Figure 14:
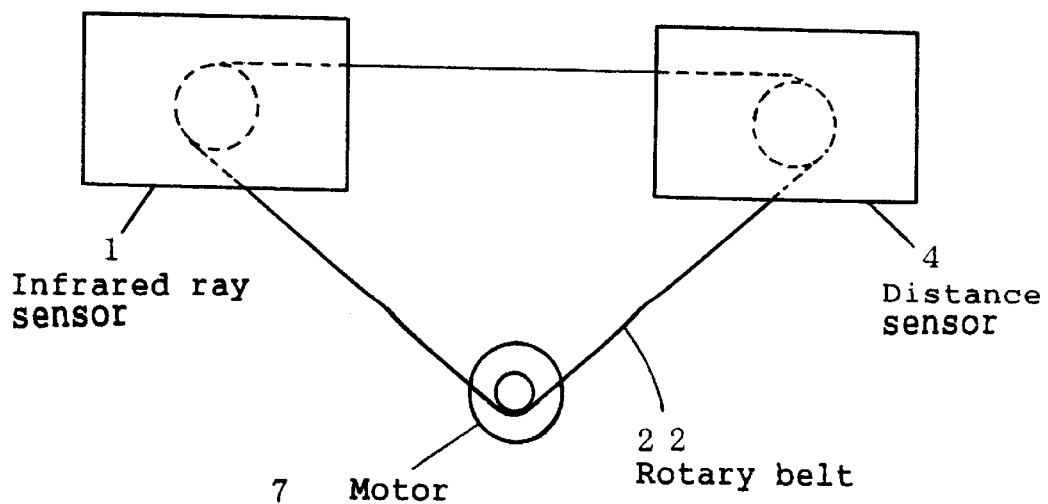
FIG. 14 is a plan view showing a sixth embodiment of the invention.

FIG. 14 is a plan view explaining a sixth embodiment of the invention. In the apparatus of the first embodiment, the infrared ray sensor 1 and distance sensor 4 rotate on a same rotary shaft, but in this embodiment they are fixed in the upper part of a sensor fixing table, each on an independent rotary shaft. When a DC servo motor 7 rotates, its driving force is transmitted to the sensor fixing tables through a rotary belt 22. Since the infrared ray sensor 1 and distance sensor 4 are mounted on independent rotary shafts, the infrared ray sensor 1 is less affected by the thermal generation of the distance sensor 4, and the height of the apparatus itself can be lowered, too. Therefore, this apparatus can be easily incorporated into a television or other appliances. Incidentally, the means for transmitting the driving force of the DC servo motor 7 is not limited to a belt, but a gear or other systems may be also used.

(Embodiment 7)

Figure 15:
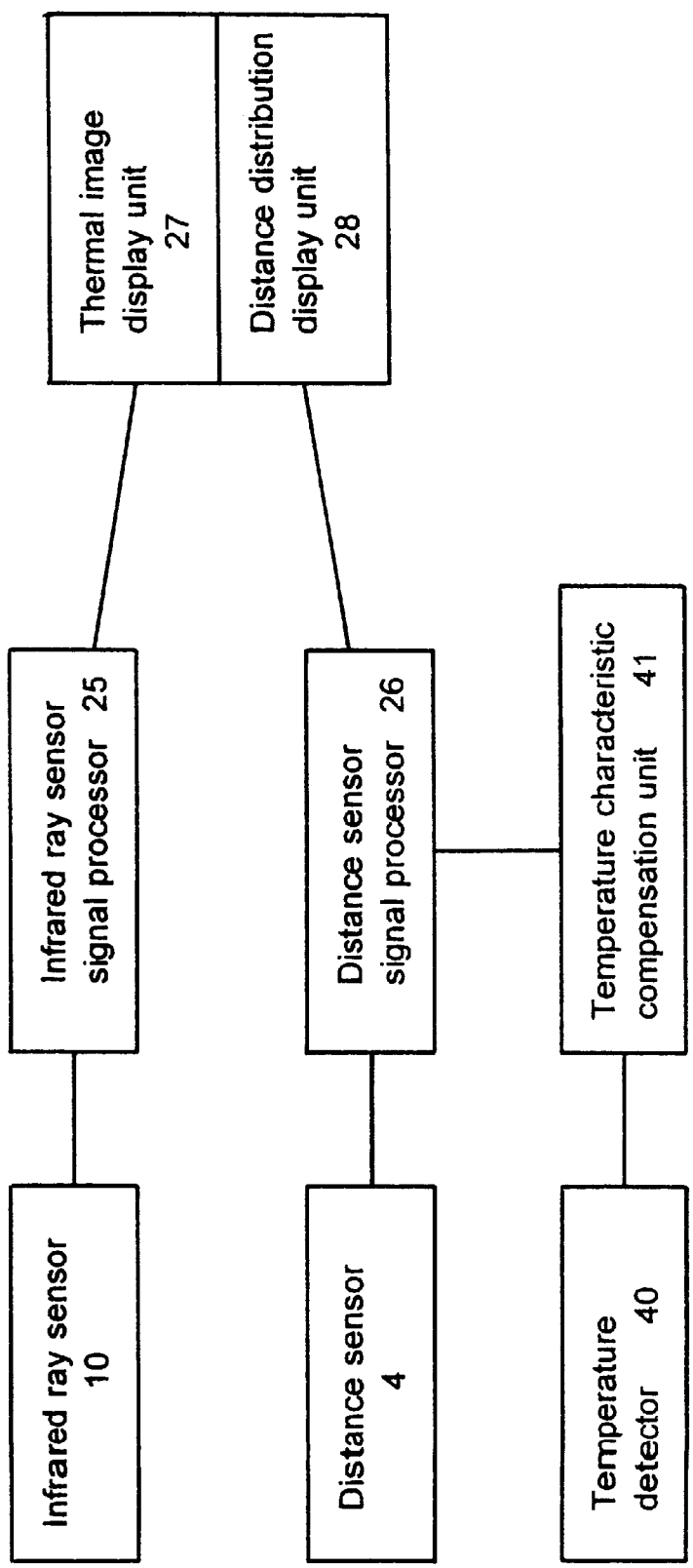
FIG. 15 is a block diagram showing a seventh embodiment: of the invention.

FIG. 15 is a diagram explaining a seventh embodiment of the invention, in which an analog signal obtained from the infrared ray sensor 10 is A/D converted in the infrared ray sensor signal processor 25. On the other hand, the sensor signal obtained from the distance sensor 4 is A/D converted as the distance information by the distance sensor signal processor 26. Moreover, by using a signal from a temperature detector 40 for measuring the temperature of the distance sensor 4, a temperature characteristic compensation unit 41 provided in the apparatus compensates for a temperature of the distance sensor 4. That is, the temperature characteristic compensation unit 41 compensates for temperature related errors in the distance data from the distance sensor signal processor 26. This compensation enhances the detection precision. Others components of this embodiment are the same as in the other embodiments.

(Embodiment 8)

Figure 13A:
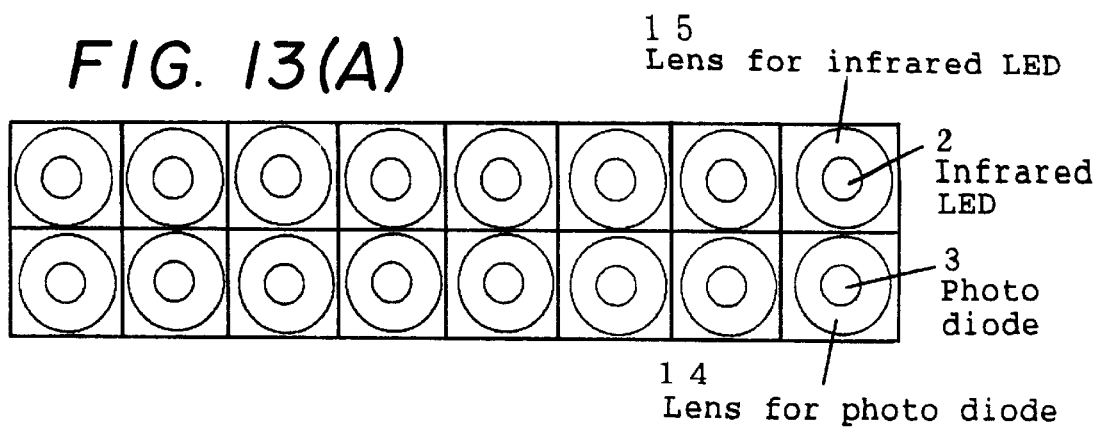
FIG. 13(A) is an outline structural diagram of distance sensor in an eighth embodiment of the invention.
Figure 13B:
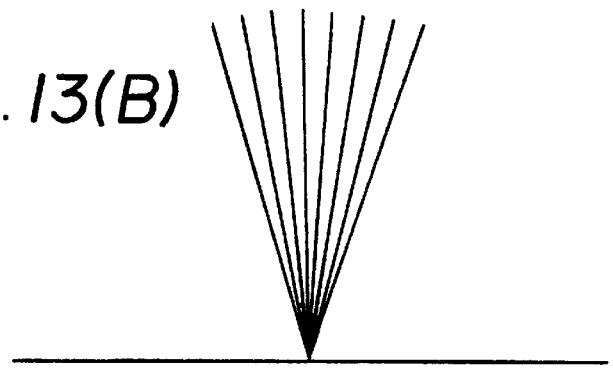
FIG. 13(B) is a schematic diagram showing its detection viewing field distribution.

FIGS. 13 (A) and 13 (B) are diagrams for explaining an eighth embodiment of the invention, in which FIG. 13(A) is an outline structural diagram showing the distance sensor in the thermal object measuring apparatus of the embodiment, and FIG. 13(B) is a schematic diagram showing the detected viewing field distribution of the distance sensor. The distance sensor in this embodiment comprises a plurality (eight in this example) of pairs of infrared LEDs 2 and photo diodes 3, disposed in a horizontal direction., and the detecting direction of each pair of infrared LED 2 and photo diode 3 is set at an interval of, for example, 5 degrees within the horizontal plane as shown in FIG. 13(B). On the other hand, for the infrared ray sensor used as thermal sensor, any one of the infrared ray sensors disclosed in embodiment 1 to embodiment 7 may be incorporated.

This embodiment is effective when information at a certain height can be obtained in the vertical direction, and rotary scanning is not necessary for the distance sensor, so that the measuring time is short. Moreover, since the infrared ray is used for distance detection, as compared with a distance sensor using ultrasonic waves, a distance distribution within a horizontal plane can be obtained in an extremely short time for a long distance. Herein, the interval in the detecting direction is 5 degrees, but it may be freely adjusted to match the rotary scanning interval of the infrared ray sensor.

Thus, since the distance distribution for a long distance can be obtained in a very short time, the distance sensor according to the invention may be also considered for use simply as a distance detector, i.e., by making use of the distance sensor only, for detecting the distance of, for example, plural moving objects, or separating individual moving objects.

(Embodiment 9)

Figure 16:
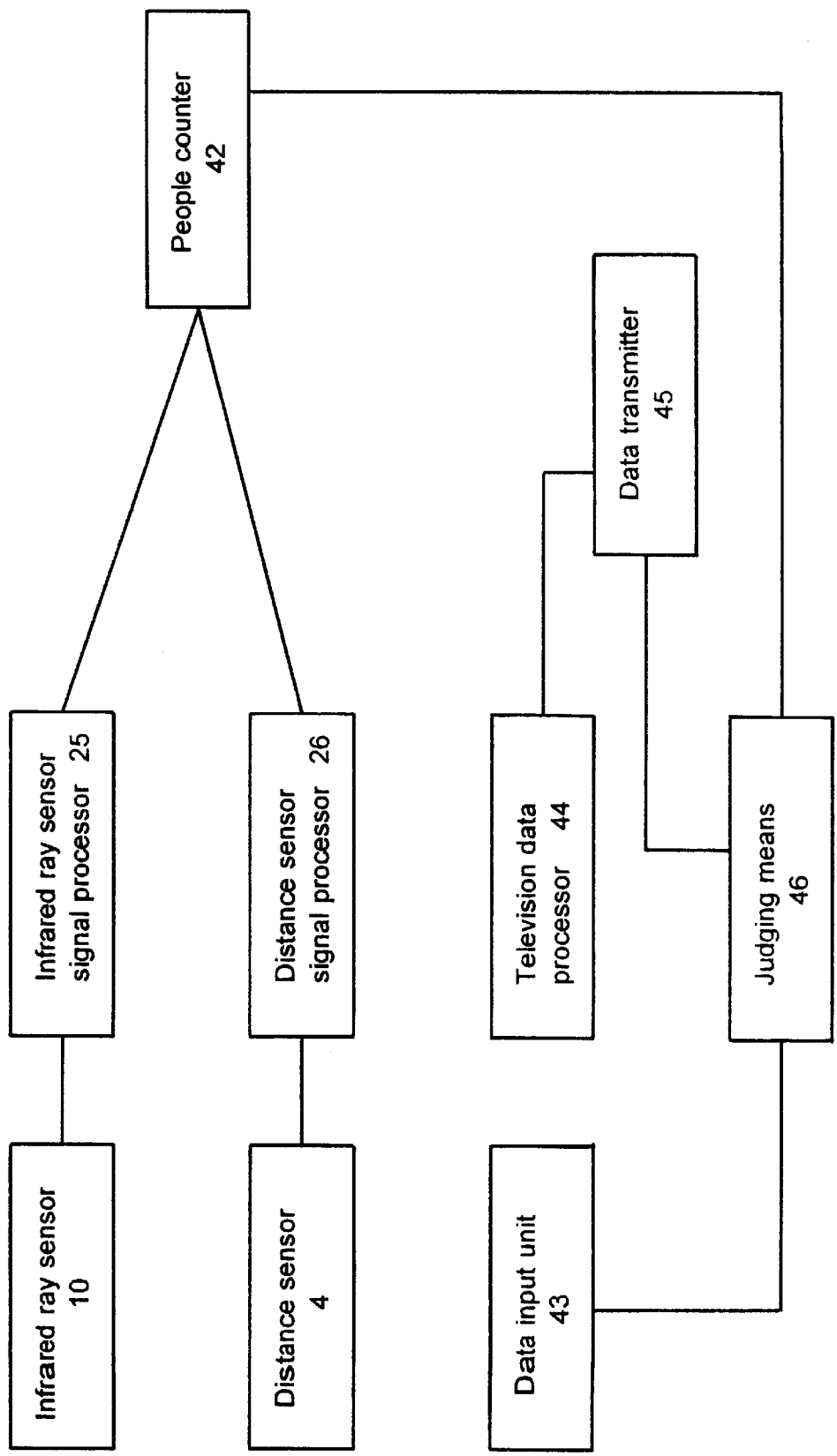
FIG. 16 is a block diagram showing a ninth embodiment of the invention.

FIG. 16 is a diagram explaining a viewer survey system in a ninth embodiment of the invention. The thermal object measuring apparatus is placed on a television or the like, and its people counter 42 counts the number of human bodies in the sensor detection range on the basis of the signal from the infrared ray sensor 10 and distance sensor 4. A television data processor 44 outputs the television on/off state, and the channel and time zone of the program being presently broadcast. On the other hand, the people before the television enter the status of viewing by using the individual remote controllers through a data input unit 43. Judging means 46 enters the output from the data input unit 43 and output from the people counter 42, and judges if the both coincide or not. As a result, if the outputs coincide, then a data transmitter 45 transmits the information from the television data processor 44 to the viewer survey center through telephone circuit or the like. If the outputs do not coincide, then the judging means 46 warns the people before the television by sounding the buzzer or flickering the LED, urging the input of the status of viewing. The viewer manipulates the data input unit 43 in reaction to the warning.

In this way, by rotating and scanning the pyroelectric type infrared ray sensor having a chopper and the distance sensor composed of an infrared LED and photo diode, the two-dimensional temperature distribution and the distance information of the object in space can be obtained, so that the human body can be detected with high precision. Furthermore, by using near infrared rays in distance detection, and enhancing the directivity of the detector with a lens, as compared with the conventional ultrasonic method, it is easy to identify objects by their difference in distance, even for a long distance. Also, when counting plural people moving in overlapped positions, for example, if there is a slight deviation between people which can be recognized by the infrared ray sensor, they can be separated by detecting the difference in distance in the longitudinal direction as seen from the apparatus.

In the foregoing embodiments, infrared LEDs are used as infrared ray emitting devices. However, the infrared ray emitting devices need not be limited to infrared LEDs. Instead, for example, infrared ray laser diodes and other devices may be also used.

In the above embodiments, photo diodes are used as light receiving elements, but photo transistors and others may be similarly used.

In the embodiments, the number of infrared LEDs in the distance sensor was either four or eight, but the number of infrared LEDs is not particularly limited.

Figure 31:
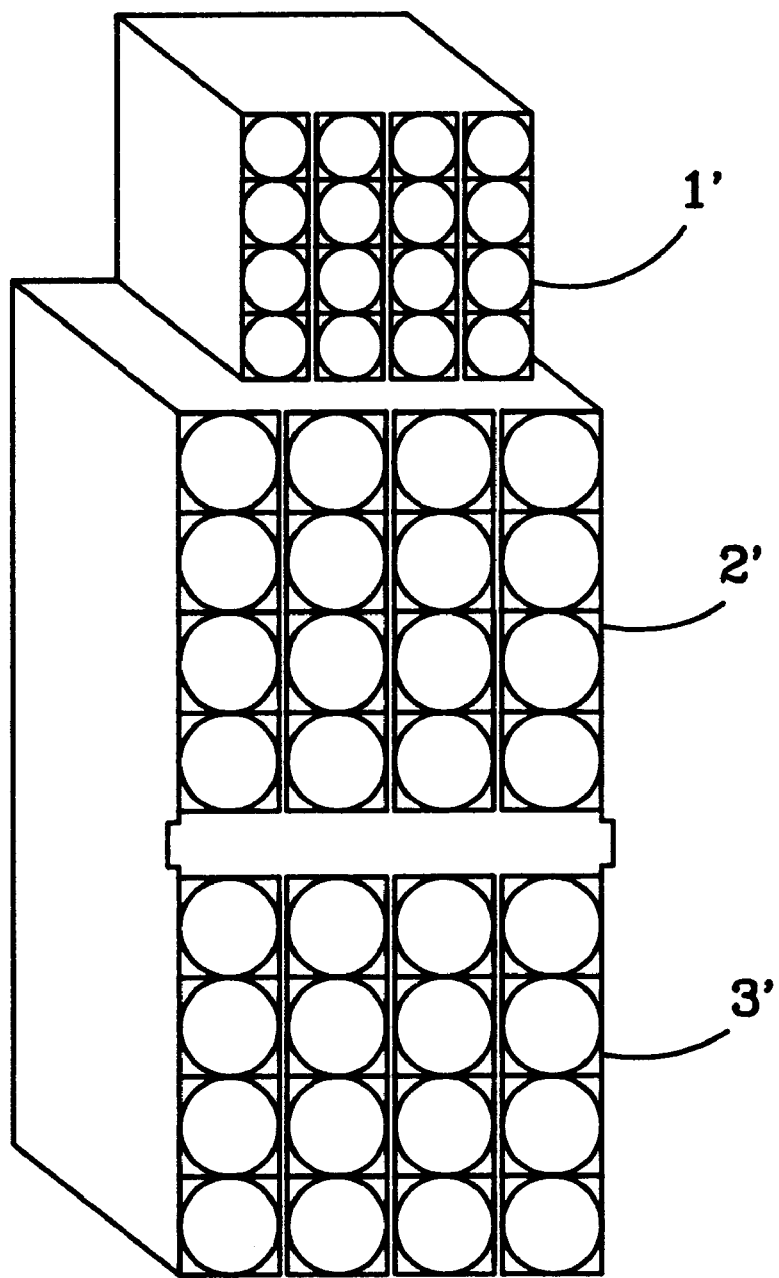
FIG. 31 is a perspective view showing the two dimensional infrared ray sensor and the two dimensional infrared LED and the two dimensional photo diode of an embodiment of the invention.

FIG. 31 shows the two dimensional type apparatus. That is 1' is a two dimensional infrared ray sensor and 2' is a two dimensional infrared LED and 3' is a two dimensional photo diode. Such an apparatus can obtain a thermal image without rotation of the apparatus.

Further embodiments of the invention are described below.

(Embodiment 10)

Figure 17:
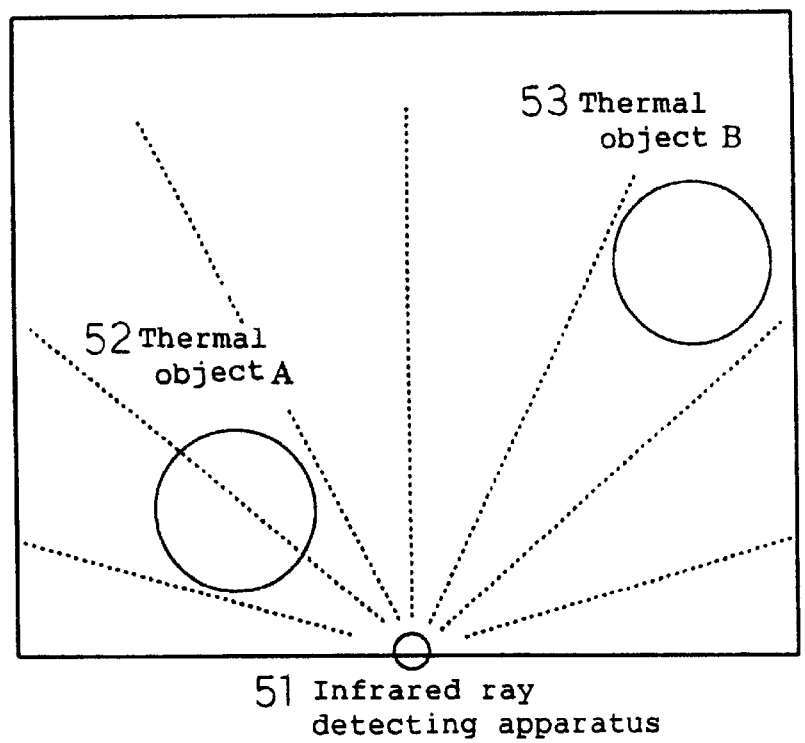
FIG. 17 is a schematic diagram of measuring space for a tenth embodiment of the invention.
Figure 18:
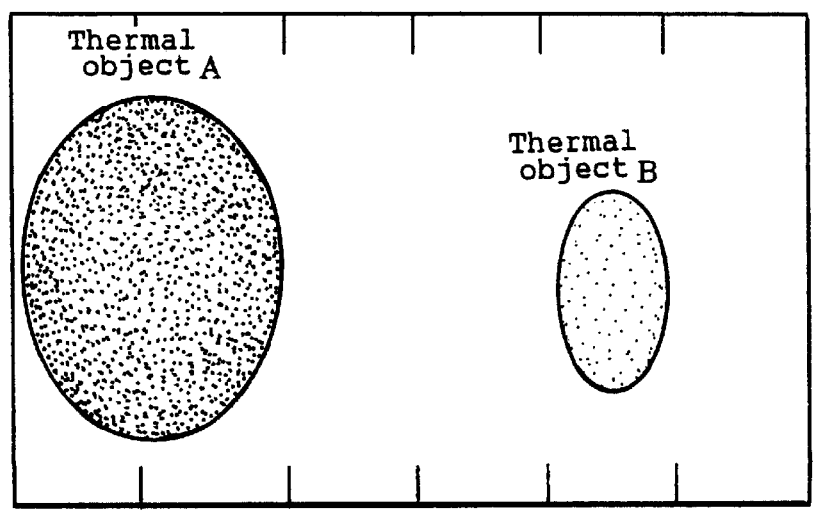
FIG. 18 is a two-dimensional thermal image of the measuring space in FIG. 17.

FIG. 17 shows an outline of a tenth embodiment of the invention, in which the measuring space is seen from above. Two thermal objects are identical objects and the surface temperature is supposed to be same. For this space, the thermal image obtained by the pyroelectric type two-dimensional infrared ray detecting apparatus is as shown in FIG. 18. It shows the output of the infrared ray sensor is greater when the color is deeper. The thermal object A closer to the position of the detecting apparatus is detected as being larger, and the remote thermal object B as being smaller. The output or temperature level of the infrared ray sensor element is high in the thermal object A closer to the detecting apparatus, and lower in the remote thermal object.

Figure 19:
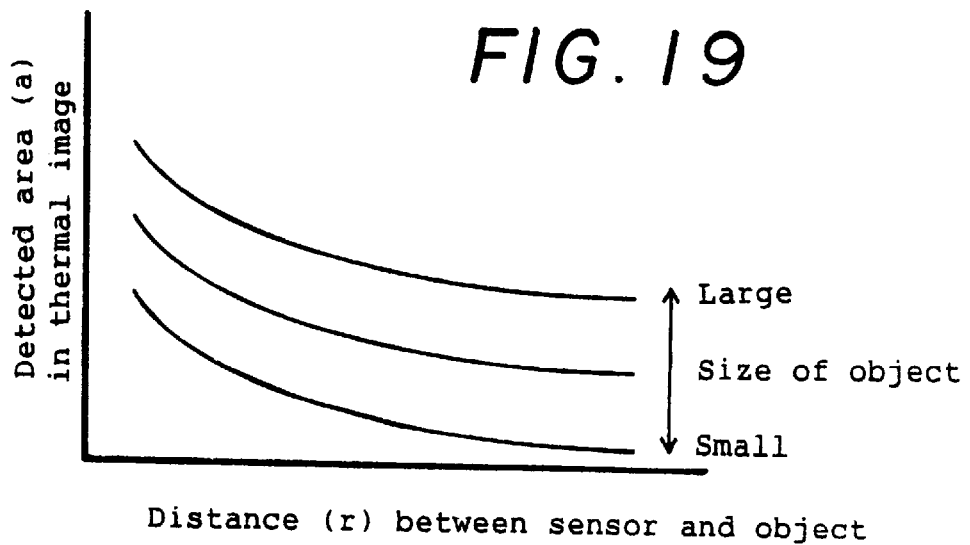
FIG. 19 is a graph showing the relationship between the detecting area (a) in a thermal image and the sensor-object distance (r).

Such a relationship is expressed in FIG. 19. The detection area (a) of a two-dimensional thermal image of a thermal object of a certain size is inversely proportional to the square of the distance (r) from the sensor.

Figure 20:
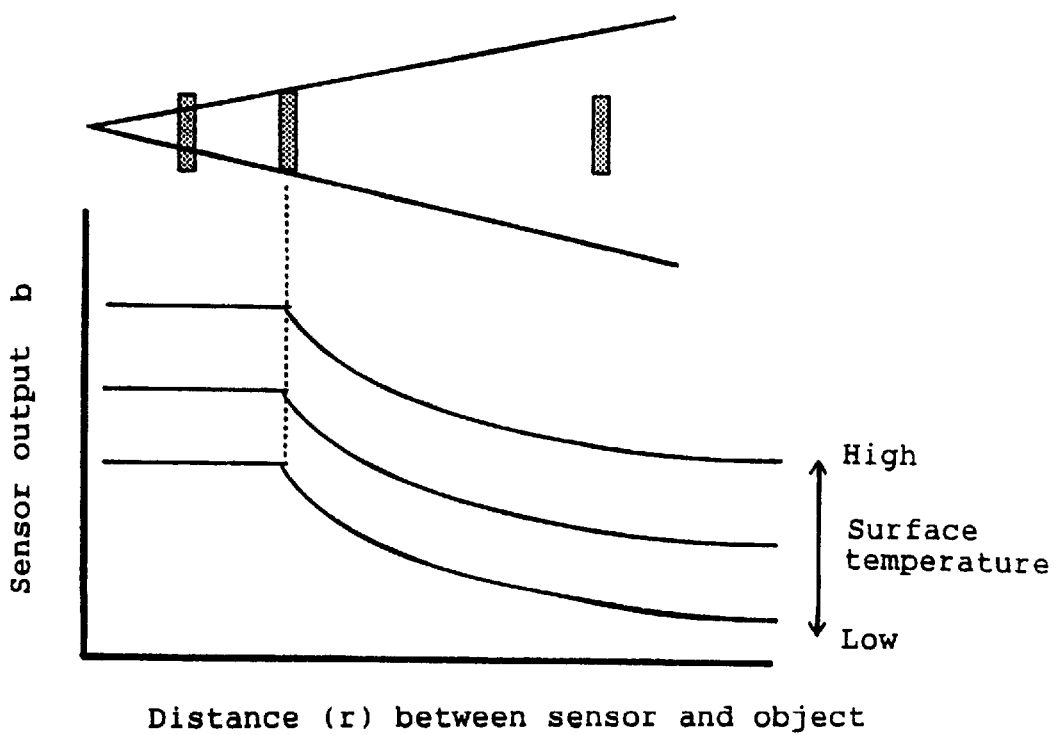
FIG. 20 is a graph showing the relationship between the infrared ray sensor output (b) and the sensor-object distance (r).

On the other hand, as for the output temperature of the infrared ray sensor element, since this detecting apparatus operates by light condensed by the lens, the period in which the portion having a certain surface temperature is out of the viewing field of the sensor because it is too close to the sensor as shown in FIG. 20 is constant (left side of the diagram). However, where (r) is greater, it becomes a mean output in the entire detected region, and hence the temperature output of the infrared ray sensor element decreases (right side of the drawing).

In other words, by correcting the size or temperature output of the object thermal image in the two-dimensional thermal image by using the position information obtained by the infrared ray detecting apparatus, the size or surface temperature of the thermal object can be specified accurately.

FIG. 21 shows correction of the thermal image in FIG. 18 by using the distance information obtained by the object detecting means. After correction, both were detected as the same size and same temperature level.

(Embodiment 11)

Figure 23:
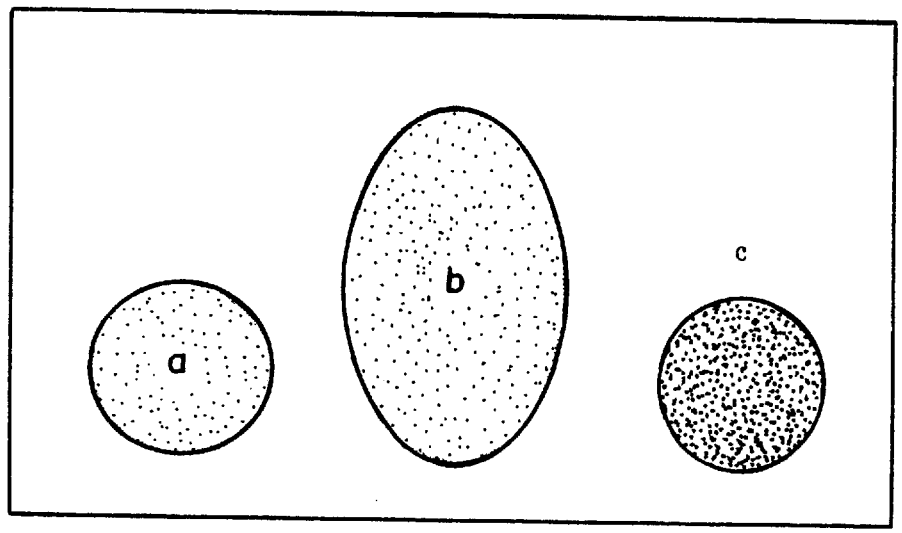
FIG. 23 shows a thermal image after correction by a distance factor for the measuring space in FIG. 22.

FIG. 23 shows a thermal image obtained by correction of the two-dimensional thermal image detected by the infrared ray detecting apparatus for the measuring space shown in FIG. 22. The thermal image is corrected by using the distance information obtained by using the object position detecting means. In FIG. 22, reference numeral 1 denotes an infrared ray detecting apparatus, 62 is a portable computer, 63 is a human body, and 64 is a heating unit. Object (a) is similar to the human body in the temperature level, but is very small in size as compared with human body (b). Since the thermal image is corrected, (a) is judged not to be a human body.

In addition, by considering the corrected temperature level of a thermal object, for example, a very hot object such as the heating unit 64, a human body (a) can be distinguished, and the presence of a human body can be judged with higher precision. In this method, an object over 50 degrees Celsius can be judged.

(Embodiment 12)

Figure 24:
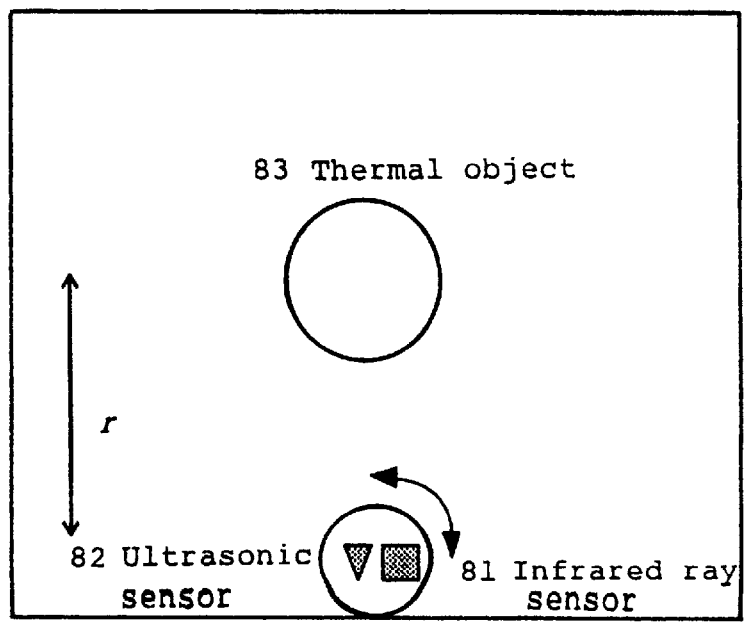
FIG. 24 is a schematic diagram of a measuring space for a twelfth embodiment of the invention.
Figure 25:
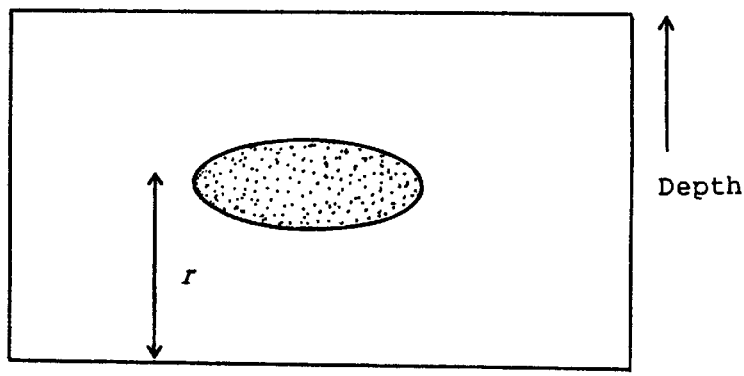
FIG. 25 is an echo pattern by ultrasonic sensor for the measuring space in FIG. 24.
Figure 26:
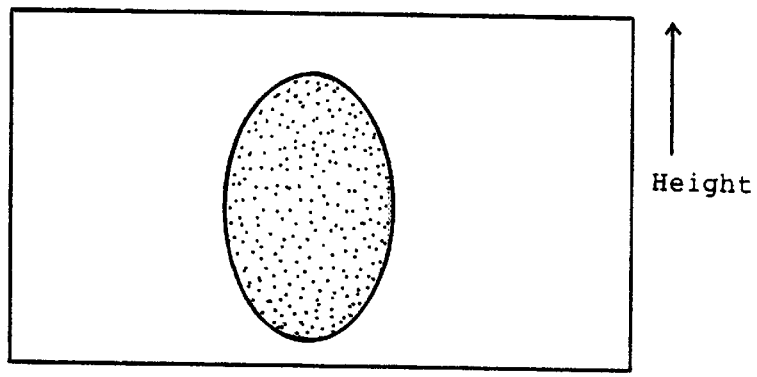
FIG. 26 is a two-dimensional thermal image by infrared ray sensor for the measuring space in FIG. 24.

In FIG. 24, as an infrared ray detector, a plurality of pyroelectric type infrared ray sensor elements 81 disposed in an array are used, and an ultrasonic sensor 82 for transmitting ultrasonic waves and receiving reflected waves is used as object position detecting means, and their directions are continuously rotated. Two-dimensional thermal images and ultrasonic echo patterns obtained by such an apparatus are shown in FIG. 25 and FIG. 26. Reference numeral 83 is a thermal object.

By the ultrasonic echo pattern (FIG. 25), the position of the thermal object in the two-dimensional thermal image can be identified, and by correcting the thermal image (FIG. 26) by the distance between the sensor 81 and object 83 obtained therefrom, the size and temperature level of the thermal object can be determined precisely.

Alternatively, by preliminarily detecting the background object position in the measuring space during an unmanned state by a signal from the ultrasonic sensor 82, and comparing this with the signal from the detecting means when measuring, the newly entering object can be detected, and it is possible to decrease the judging errors of taking non-human objects as human bodies.

(Embodiment 13)

Figure 27:
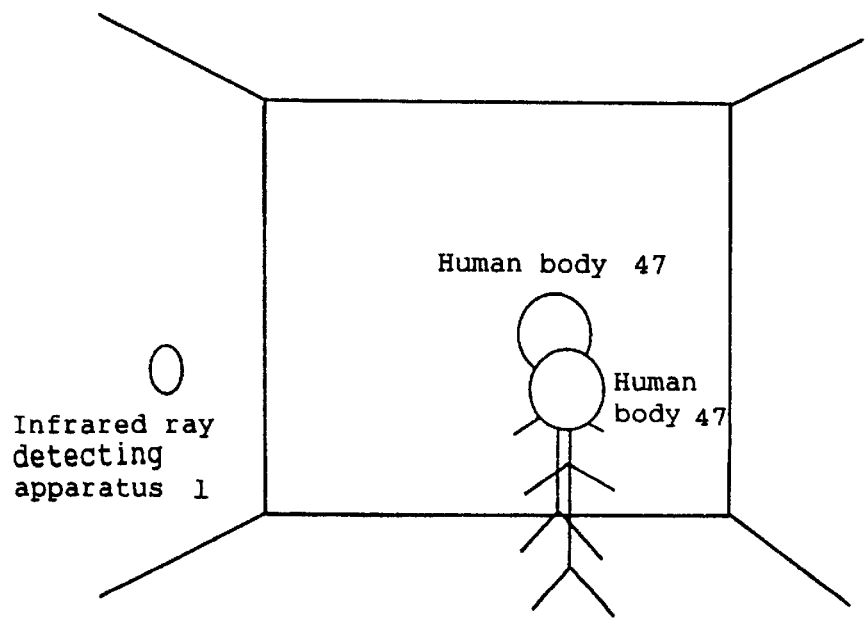
FIG. 27 is a schematic diagram of a measuring space for a thirteenth embodiment of the invention.
Figure 28:
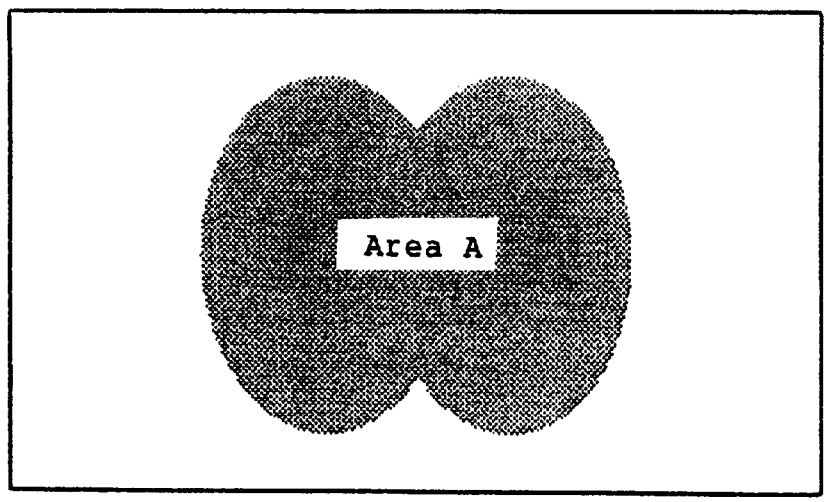
FIG. 28 is a two-dimensional thermal image for the measuring space in FIG. 27.
Figure 29:
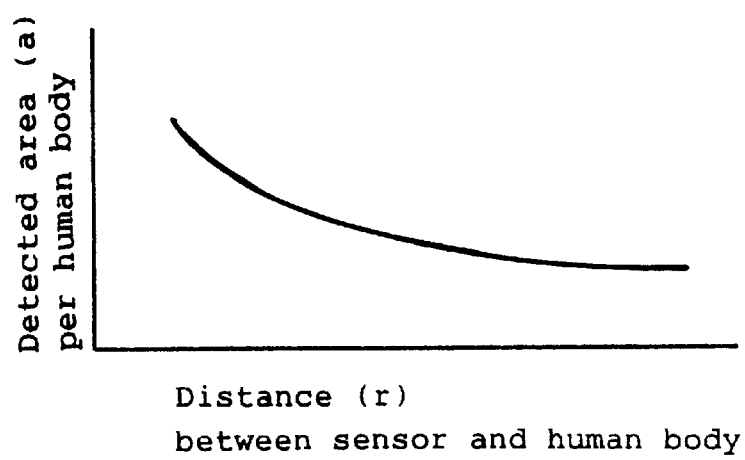
FIG. 29 shows the relationship between the detected area per human body in the two-dimensional thermal image and the sensor-human distance.

FIG. 28 shows a two-dimensional thermal image obtained by infrared ray detecting means for the measuring space shown in FIG. 27. Plural human bodies 47 are very close to each other, and they are detected as one big thermal object (area A) in the thermal image. As the countermeasure to correct this error, preliminarily, the relationship between the distance between the infrared ray detecting apparatus 1 and human body 47, and the detection area (a) per human body 47 is investigated, and a curve as shown in FIG. 29 is plotted. When measuring the number of people existing in the room, the detecting area per human body 47 is obtained from the distance (r) measured by the object position detecting means, and the area of the detected thermal image is divided (A/a), so that the number of human bodies 47 contained in the thermal image can be calculated.

(Embodiment 14)

Figure 30:
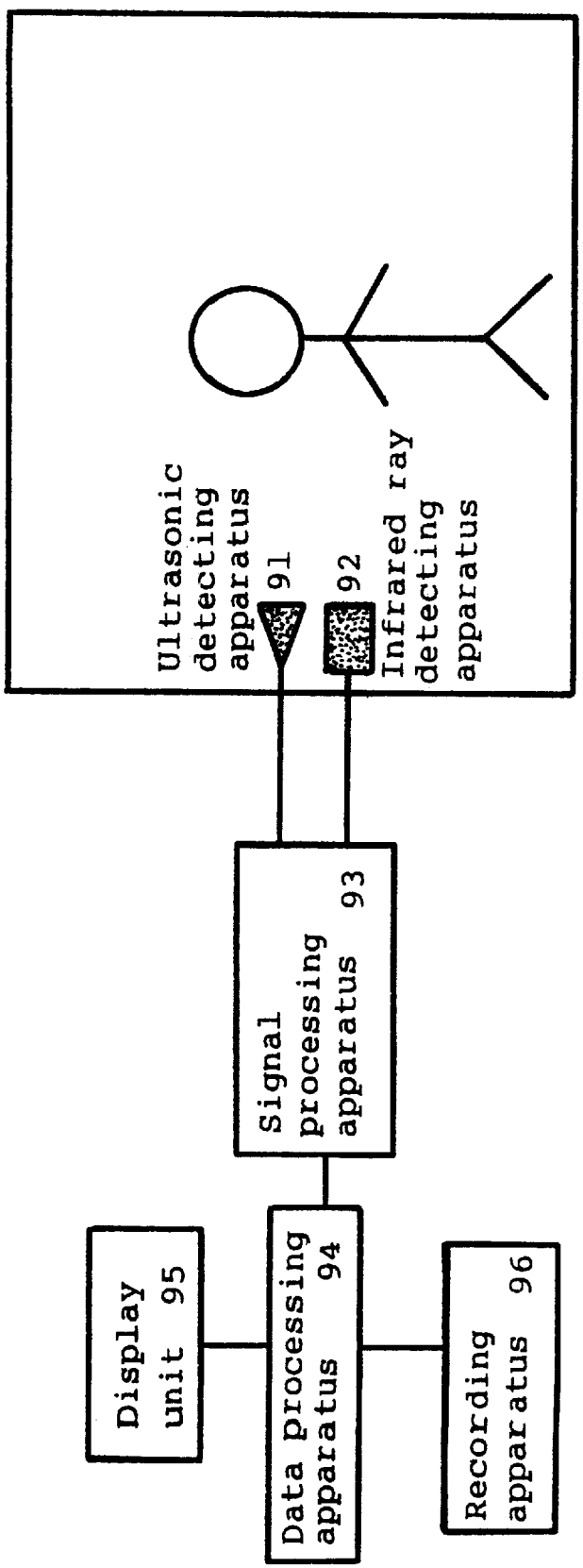
FIG. 30 is a schematic diagram of a human body detecting apparatus in a fourteenth embodiment of the invention.

FIG. 30 shows an outline of a detecting system of the number and position of people existing in a room. The system is composed of an infrared ray detecting apparatus 91 serving as infrared ray detecting means, and an ultrasonic detecting apparatus serving as object position detecting means. Output signals from the infrared ray detecting apparatus 91 and ultrasonic wave detecting apparatus 92 are recomposed into a two-dimensional thermal image and ultrasonic echo pattern by a signal processing apparatus 93, and sent into a data processing apparatus 94. In the data processing apparatus 94, which serves as correcting means, the transmitted two-dimensional thermal image is corrected by a distance factor, and the human body is extracted by the detecting method from the corrected thermal image, and the number of people in the room is calculated. The result is displayed in a display device 95, and is recorded in a stationary memory or the like by a recording apparatus 96. By transmitting the output information from this system to the communication system, moreover, it can be utilized in a monitoring system and other systems.

The object position detecting means of the invention may also be embodied by means for measuring the distance by transmitting electromagnetic waves and receiving reflected waves. Of course it may be means for measuring the distance by making use of the infrared ray sensor.

In the foregoing embodiments, the sensor signal processing means, thermal object detecting means, and other means are composed of hardware, but instead similar functions may be also composed in software by using computers.

As clear from the description herein, according to the invention, the apparatus for detecting a thermal object can be manufactured at low cost and in small size, and the detecting precision can be enhanced.

It is also possible to detect the number and position of human bodies accurately.

What is claimed is:

1. A thermal object detecting method comprising the steps of:

obtaining a thermal image of a measuring space by two-dimensional thermal image detecting method for detecting two-dimensional thermal image information, obtaining position information of an object in the measuring space by object position detecting means, obtaining distance data between said two-dimensional thermal image detecting means and said object from the position information, and correcting the temperature level of the object in the thermal image in the measuring space or correcting the size of the object in the thermal image in said measuring space, using the distance data from the object as correction factor.

2. A human body detecting method for detecting only the human body in the measuring space, by obtaining the temperature and size of the object, by making use of the object detecting method of claim 1.

3. A human body detecting method of claim 2, wherein the number of persons calculated by dividing an area of said detected thermal image by an area per person considering the distance between said image detecting means and the human body.

4. A thermal object detecting apparatus comprising:

two-dimensional thermal image detecting means for detecting two-dimensional thermal image information, object position detecting means for detecting the position of an object in the measuring space, and correcting means for correcting the temperature level of the object in the thermal image in the measuring space or correcting the size of the object in the thermal image in said measuring space, using distance data of said thermal image detecting means and said object obtained from position information from said object position detecting means as a correction factor.

5. An object detecting apparatus of claim 4, wherein said two-dimensional thermal image detecting means is infrared ray detecting means capable of obtaining a two-dimensional thermal image by continuously rotating the scanning direction of an infrared ray array sensor element having a plurality of detectors disposed in an array.

6. An object detecting apparatus of claim 4, wherein said object position detecting means is ultrasonic detecting means for obtaining an object position by continuously rotating the scanning direction of an ultrasonic sensor for transmitting an ultrasonic wave and receiving a reflected wave.

7. An object detecting apparatus of claim 4, wherein said object position detecting means is distance measuring means for measuring the distance by transmitting an electromagnetic wave and receiving a reflected wave.

8. A human body detecting apparatus comprising:

two-dimensional thermal image detecting means for detecting two-dimensional thermal image information, object position detecting means for detecting the position of an object in the measuring space, correcting means for correcting the temperature level of the object in the thermal image in the measuring space and/or correcting the size of the object in the thermal image in said measuring space, using the distance data of said thermal image detecting means and said object obtained from the position information from said object position detecting means as correction factor, judging means for judging if the object is a human body or not, by making use of the corrected object temperature and/or object size, and means for calculating the number of person by dividing the area of said detected thermal image by the area per person considering the distance between said image detecting means and the human body.

* * * * *